(12) United States Patent
Binder et al.

(10) Patent No.: US 6,541,965 B1
(45) Date of Patent: Apr. 1, 2003

(54) INDUCTIVE SENSOR ARRANGEMENT WITH FIELD COILS AND SENSE COILS, AND METHODS FOR DETECTING FERROUS OBJECTS

(75) Inventors: Albert Binder, Buchs (CH); Roger Golder, Cambridge (GB)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/687,641

(22) Filed: Oct. 13, 2000

(51) Int. Cl.⁷ .......................... G01V 3/10; G01V 3/165; G01N 27/72
(52) U.S. Cl. .................. 324/243; 324/329; 324/232
(58) Field of Search ................ 324/326, 329, 324/67, 232, 207.17, 241–243

(56) References Cited

U.S. PATENT DOCUMENTS

| | | | | |
|---|---|---|---|---|
| 2,124,579 A | * | 7/1938 | Knerr et al. ............... | 324/226 |
| 2,546,771 A | | 3/1951 | Mork ......................... | 324/243 |
| 4,053,828 A | | 10/1977 | Ambler et al. ............. | 324/239 |
| 4,818,935 A | * | 4/1989 | Takahashi et al. .......... | 324/232 |
| 5,689,184 A | * | 11/1997 | Jeffers et al. ............... | 324/243 |
| 5,729,143 A | * | 3/1998 | Tavernetti et al. .......... | 324/329 |

FOREIGN PATENT DOCUMENTS

| | | |
|---|---|---|
| DE | 932030 | 8/1955 |
| EP | 0366221 | 5/1990 |
| FR | 2353068 | 12/1977 |

* cited by examiner

*Primary Examiner*—Edward Lefkowitz
*Assistant Examiner*—Reena Aurora
(74) *Attorney, Agent, or Firm*—Sidley Austin Brown & Wood, LLP

(57) ABSTRACT

The inductive sensor arrangement for detecting metal objects hidden in a surrounding medium comprises a pair of field coils for generating an alternating magnetic flux by a sequential excitation with an AC-current and a pair of sense coils respectively mounted inside each associated field coil in an orientation to the axes of each of said field coils such that essentially no voltage is induced in said sensor coils in an environment free of a metallic object. If a metallic object comes into the vicinity of the inductive sensor four characteristic voltage value sets are produced by the sense coil pair which become subject of an algorithmic processing for defining a position and distinction criterion in respect to said hidden metallic object. The sensor arrangement has the advantage of a single point measurement resulting in an accurate position discrimination for a hidden metallic object like a rebar in concrete.

13 Claims, 12 Drawing Sheets

INDUCTIVE SENSOR ARRANGEMENT WITH FIELD COILS AND SENSE COILS, AND METHODS FOR DETECTING FERROUS OBJECTS

FIELD OF THE INVENTION

The invention relates to an inductive sensor arrangement for detecting a ferrous object buried in a surrounding medium comprising a field coil pair for generating a penetrating alternating magnetic flux field in said medium, and a sense coil for sensing magnetic flux field disturbances caused, as the case may be, by said ferrous object.

The invention further relates to a method and its application in a hand-held machine tool for detecting a ferrous object hidden in a surrounding medium by use of the inductive sensor arrangement according to the present invention.

BACKGROUND INFORMATION AND PRIOR ART

Metal detectors usually work by measuring the change of a chosen parameter as an operator sweeps a sensing head across a surface of interest of a medium in which a disturbing piece of a metal may be hidden. The parameter could be capacitance, inductance or any other physical parameter that would allow a distinction of one material from another.

The requirement may also be to find reinforcing bars ("rebars"), usually consisting of ferrous materials, embedded in media-like concrete, brick, plaster and the like. There are detectors on the market that can fulfill this requirement but the accurate detectors must be swept across the surface of the medium, e.g. concrete. Through the "sweeping movement" of the detector it is possible through the use of the received response signals to determine the position and the (length) direction of the hidden object, e.g. the rebar. The metal coverage area may either be determined manually or automatically via a rather complicated system. In the manual determination, it is the usual practice to manually mark the coverage and direction, of the rebar, on the surface of the medium. Needless to say that this manual scanning and determination requires not only time but also a specific skill and knowledge of the user or operator.

U.S. Pat. No. 5,729,143, which presently Applicant regards as the closest prior art, metal detector including a receive coil and a transmit coil arranged in parallel overlapping winding planes and connected in an inductive bridge. This is a typical example of a metal detector that needs specific skill and knowledge of the operator for interpreting the signal response. DE 196 48 833 A1 describes an alternative prior art device for detecting and identifying hidden objects like plastic mines in a ground. This device comprises two side-by-side arranged sensor coils that are operated at different excitation frequencies. Depending on various physical properties of the hidden object like electrical conductivity, permeability etc. the impedance of a receiver coil arranged in an overlapping configuration of said two sensor coils is modified differently depending on the respective material properties. Again, the scanning of a specific ground area and the interpretation of the receive signals requires experience and skill.

SUMMARY OF THE INVENTION

It is an object of the present invention to provide an inductive sensor arrangement and a method for detecting metal objects like rebars hidden in a medium.

More specifically, it is a further object of the invention to offer an inductive sensor arrangement and to provide a method for detecting metal objects hidden in a surrounding medium by a single position measurement or a sequence of measurements, in a single position of a sensor head, in order to evaluate the position, and the coverage of a respective metallic object relative to the measurement position.

A still further object of the invention is to provide a method for determining the depth of the metal object form the surface of the medium.

An inductive sensor arrangement in accordance with the invention comprises a field coil pair and a pair of sense coils, wherein two field coils of a field coil pair are adjacently positioned at a defined distance from each other with non-overlapping winding planes and are arranged essentially in the same geometric plane, and wherein one coil of the pair of sense coils is respectively mounted inside of each field coil in an orientation to the axis of each of said field coils such that essentially no voltage is induced in said sense coils, in an environment free of a ferrous object or material. Preferably, the axes of the said sense coils are arranged orthogonally with respect to the axes of each of the corresponding one of said field coils.

A method for detecting a ferrous object hidden in a surrounding medium by use of the inductive sensor arrangement according to the invention, comprising the steps of exciting the field coil pair with predefined current ramps sequentially supplied to the two field coils of one field coil pair to produce a changing magnetic flux, penetrating the medium with at least two magnetic field patterns originating from different physical positions, collecting of four distinct output voltages from the two sense coils of one sense coil pair, i.e.

a first output voltage from a first sense coil and a second output voltage from the other sense coil of said sense coil pair while the first field coil corresponding to the first sense coil is excitated by a first one of the predefined current ramps, a third output voltage from the other sense coil and a fourth output voltage from the first sense coil of the sense coil pair while the other field coil assigned to the other sense coil is excitated by a subsequent one of said defined current ramps, and gaining a present or non-present criterion for a ferrous object by algorithmic processing of the four voltages.

Preferably, the algorithmic processing steps are performed sequentially with respect to a set of one voltage value, each of the four output voltages sensed by the sense coil pair during one excitation current ramp cycle being supplied to the field coil pair.

With the invention it becomes possible to accurately locate a metallic object, in particular a rebar, from a single point measurement. Accordingly, a sensor head and measuring unit according to the invention is simple to use, reliable and usable in confined spaces because of the one point measurement.

Other objects and further features of the present invention will become more apparent from the following detailed description when read in conjunction with the accompanying drawings.

DESCRIPTION OF THE PREFERRED EMBODIMENTS

Figure 1A:
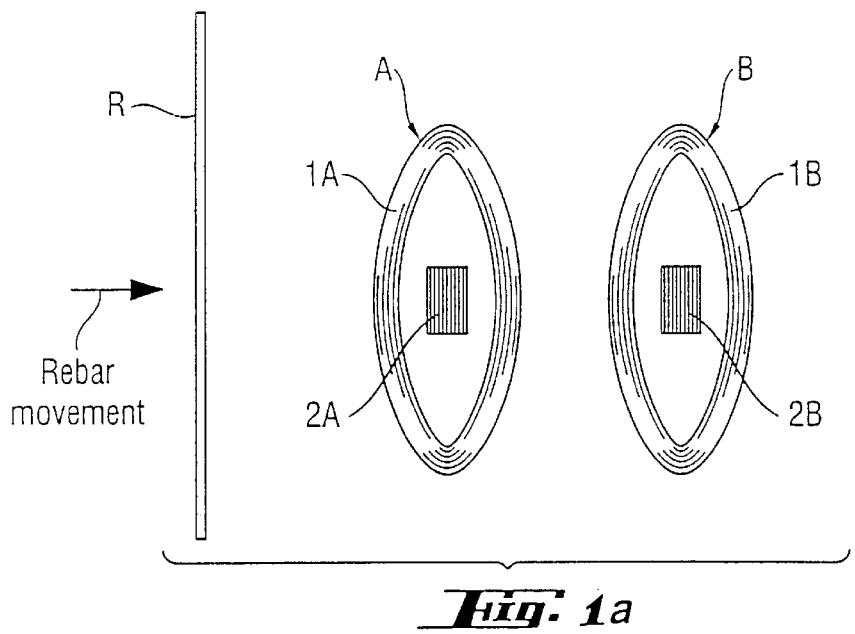
FIG. 1 shows a basic mechanical configuration of an inductive sensor arrangement of the present invention with a horizontal projection view in FIG. 1a and a sectional view in FIG. 1b.
Figure 1B:
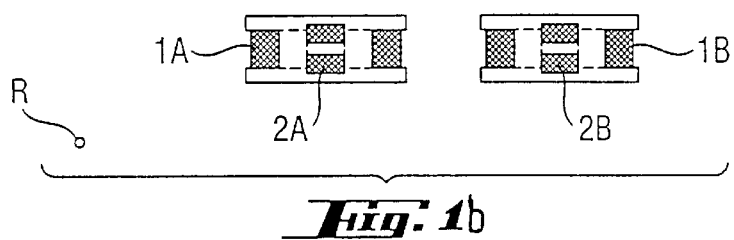

An inductive sensor coil assembly is shown in FIG. 1. It consists of two identical coil assemblies A and B, respectively, arranged in a defined center distance of typically, but in no way limited to, 30 to 70 mm. Coil assemblies A and B, respectively, each comprise a field coil 1A, 1B, respectively and a sense coil 2A, 2B, respectively. The cross-sectional shapes, i.e. the winding planes of the field coils 1A, 1B may be oval, as shown in FIG. 1, to limit the outer dimensions of the two coil assemblies A, B. The field coils 1A, 1B are driven with time sequential current ramps such that a constantly changing magnetic flux is produced. Field coil 1A is driven while field coil 1B is in a passive state, and field coil 1B is driven while field coil 1A is in the passive state. Such an arrangement excites a metallic object like a rebar R with two magnetic field patterns originating from different physical positions despite the fact that the complete coil assembly is kept fixed in one measurement position. The sense coils 2A and 2B, respectively, are mounted inside, and, as shown, orthogonal to the field coils 1A, 1B such that in a non-magnetic environment there is no induced voltage developed in the sense coils 2A, 2B. When a rebar R is brought or accessed in the vicinity of the coil assembly the balance of the magnetic field is disturbed and the sense coils 2A, 2B produce characteristic outputs.

For explanation purposes it is easier to show the voltage at the output of current i of each of the sense coils 2A, 2B as the rebar R is traversed across the top of the complete coil assembly. The graphical representations of the response voltage explained below with reference to FIG. 3 to FIG. 6 are the measured signals for passing a single rebar R over the inductive sensor assembly.

It is an essential element of the invention that by analyzing the measured signal responses a unique voltage set for each finite small movement or position shift of the rebar R is received. By superposition of the signal responses it becomes possible to predict the location of the rebar R by measuring the unique voltage sets, in particular four voltage sets, as explained below in further detail.

The coil configuration explained above works for all rebar angles in a range of approximately ±60° to the vertical direction.

Figure 2:
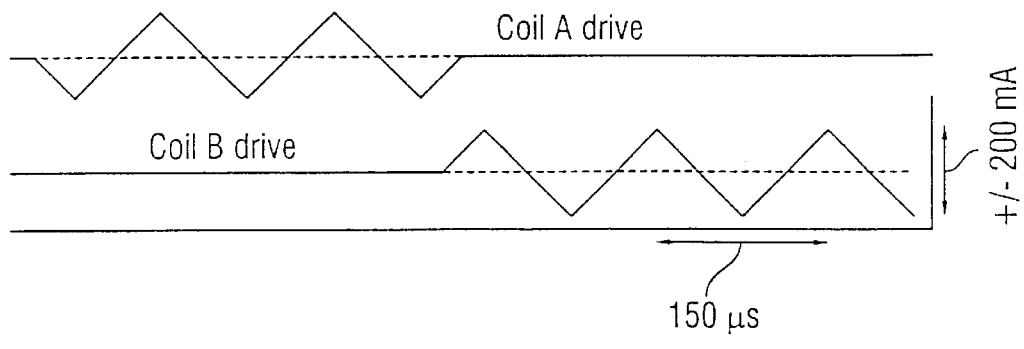
FIG. 2 shows an example of a typical current ramp sequence for excitating the two field coils of FIG. 1.
Figure 4:
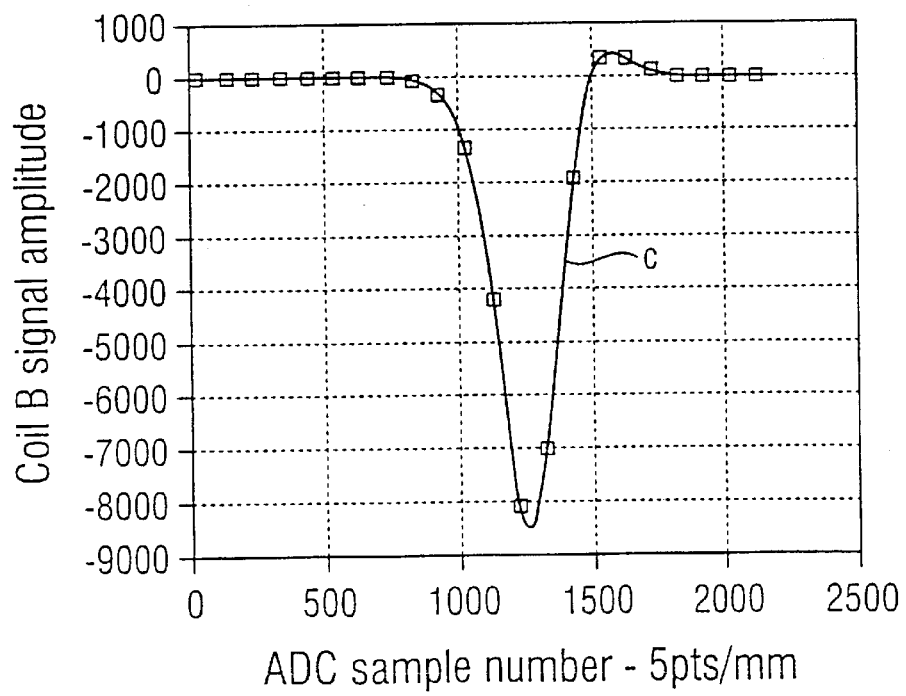
FIG. 4 shows a graphical representation of the response at the sense coil 2B when a disturbance of the magnetic field is present.
Figure 5:
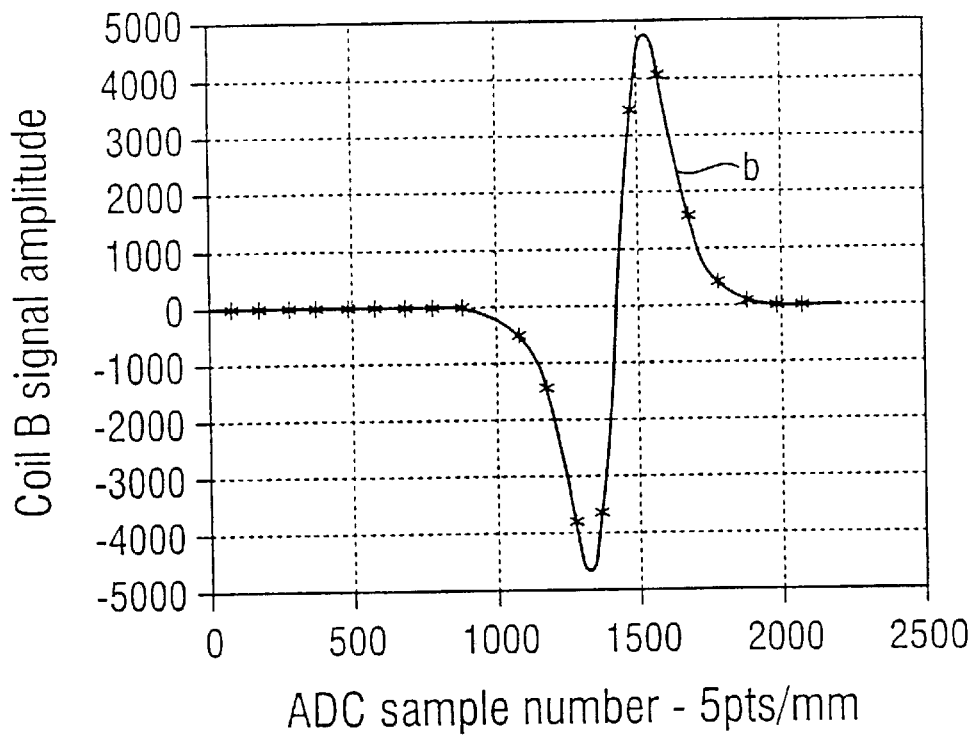
FIG. 5 shows a graphical representation of the output voltage of the other sense coil 2B when the corresponding field coil 1B is excitated by a subsequent current ramp and a metallic object is traversed.
Figure 6:
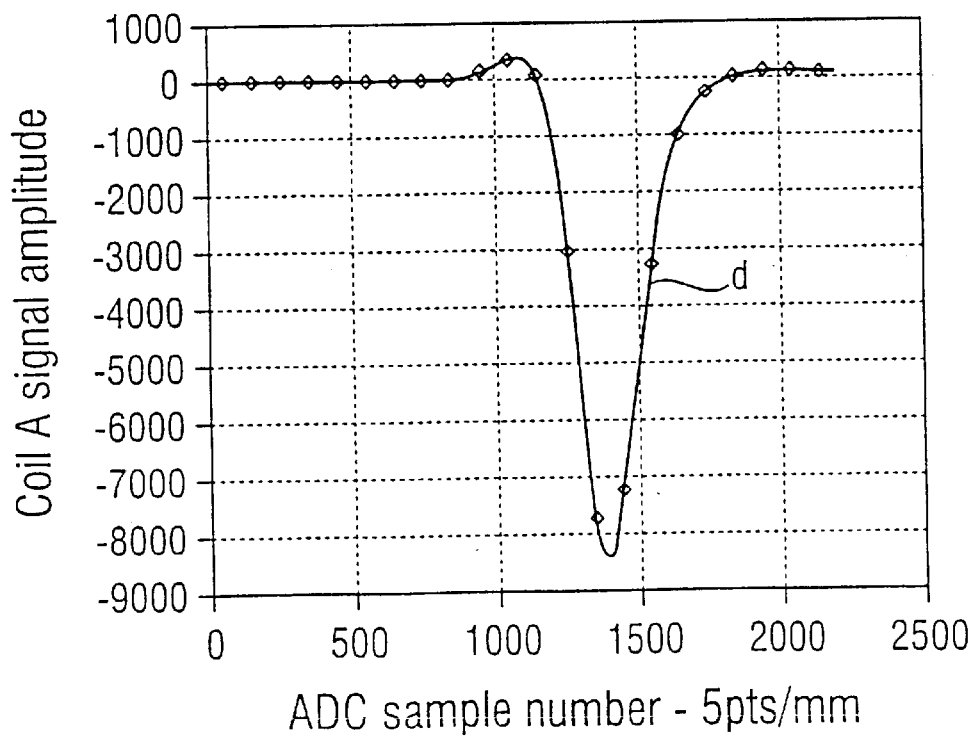
FIG. 6 shows a graphical representation of the response at sense coil 2A during current ramp excitaiton of field coil 1B and during disturbance of the magnetic field when a metallic object is traversed.

The following four output voltages, shown in FIG. 4 to FIG. 6, were collected simultaneously as the rebar R was scanned or shifted from left to right across the sensor assembly of FIG. 1. The horizontal X-axis of the graphs corresponds to five measurement values per 1 mm of movement of the rebar R. The four sensor output signals were obtained by sequentially driving each of the field coils 1A, 1B in turn. Typically, however, in no way limiting with a time duration of each driving cycle and current amplitudes as shown in FIG. 2.

Figure 3:
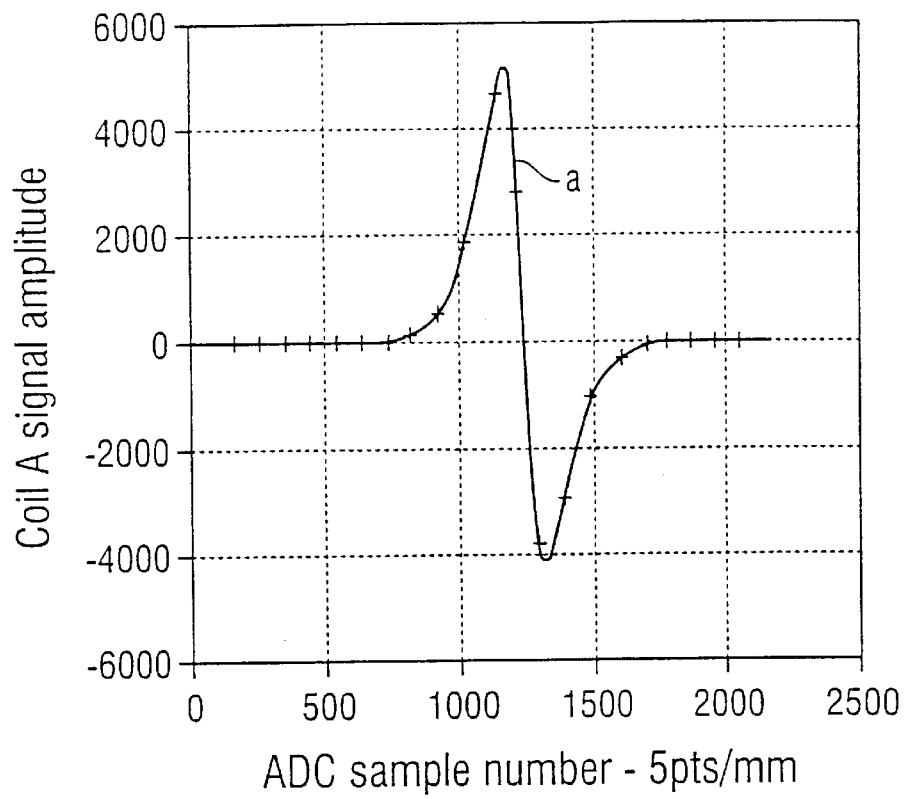
FIG. 3 shows a graphical representation of the output voltage of the sense coil 2A during current ramp excitation of the corresponding field coil 1A when a metallic object is traversed.

The graphical representation of FIG. 3 shows the output voltage of sense coil 2A rising as the rebar R approaches the sense coil 1A. As the rebar R passes over the top of sense coil 2A the trace falls and goes through zero. As the rebar R moves away the voltage falls further. This is called the "S curve" response (curve a), and its height and width are functions of the rebar size and the distance from the sensor assembly, as explained further below. FIG. 5 shows the S curve response from sense coil 2B if field coil 1B is excitated. This S curve (curve b) is inverted because the rebar R is approaching the sense coil 2B from the center of the sensor assembly, i.e. the opposite magnetic direction.

FIG. 4 and FIG. 6, respectively, show the response at the sense coils 2A, 2B while the respectively opposite field coils 1B, 1A are driven. These output voltages are responsive to a disturbance of the magnetic field in the presence of a rebar R. As with the S curves a and b of FIG. 3 and FIG. 5, respectively, their amplitude is dependent upon the size and distance of the rebar R from the sensor assembly. These outputs are called the "Hump-curves" (curves c and d) are not useful for providing positional information but can be used to generate a threshold level for tracking the amplitude of the wanted S curves, i.e. the Hump-curves are useful for the signal processing.

Figure 7:
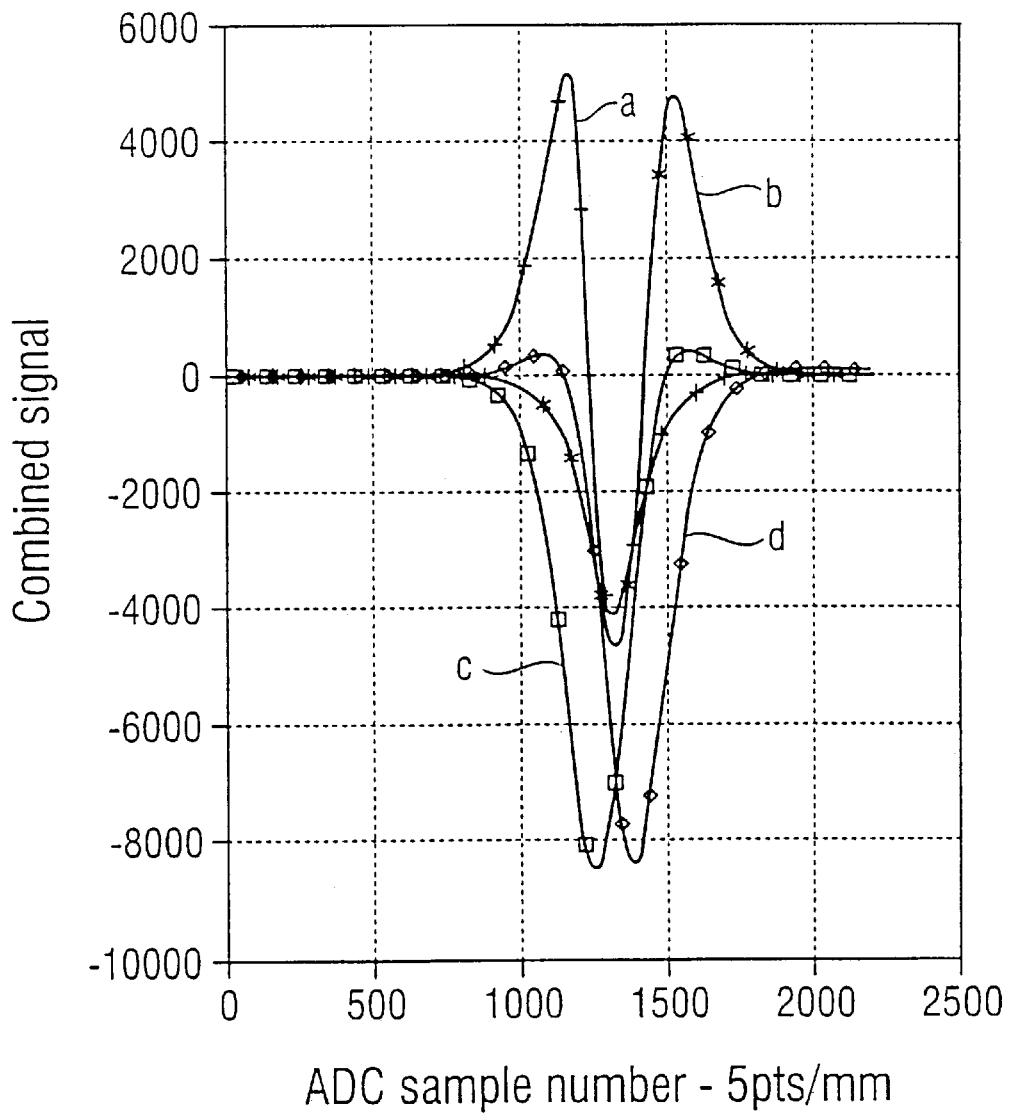
FIG. 7 shows a combined plot diagram of the two signal pairs induced in the sense coils 2A, 2B during a certain sequence of subsequent current ramp excitation cycles for which the individual signal responses are shown in FIGS. 3 to 6.

FIG. 7 shows the combined plots of the S curves a, b of FIGS. 3 and 5 and the Hump-curves c, d of FIGS. 4 and 6.

In the following description, and with reference to the plots of FIGS. 8 to 13 a simple low-cost detection algorithm is described to indicate the detection of a metallic object, e.g. a rebar R. Other algorithms using analog or digital signal processing techniques are feasable.

The simple and easy to implement algorithm described herein is used for finding the metallic object (rebar R), in three steps, as follows:

1. Add the two S curves a, b (FIGS. 3 and 5) together. The new shape or curve a is called the "Add-curve". The minimum, i.e. the lowest point of the Add-curve a is the position of the rebar's center (see FIG. 8).
2. Take the more negative of the Hump-curves c, d (FIGS. 4 and 6) at each sample (see FIG. 9) and multiply the result by a specific weighting factor α with $-0.5 \leq \alpha \leq 0.9$, preferably $-0.2 \leq \alpha \leq 0.6$ and in particular α=0.2. The new shape or curve f will be called the "Threshold-curve".
3. Compare the level of the Add-curve e against the -Threshold-curve f. If the Add-curve a is more negative than the Threshold-curve f then a rebar R is deemed to be detected.

Figure 10:
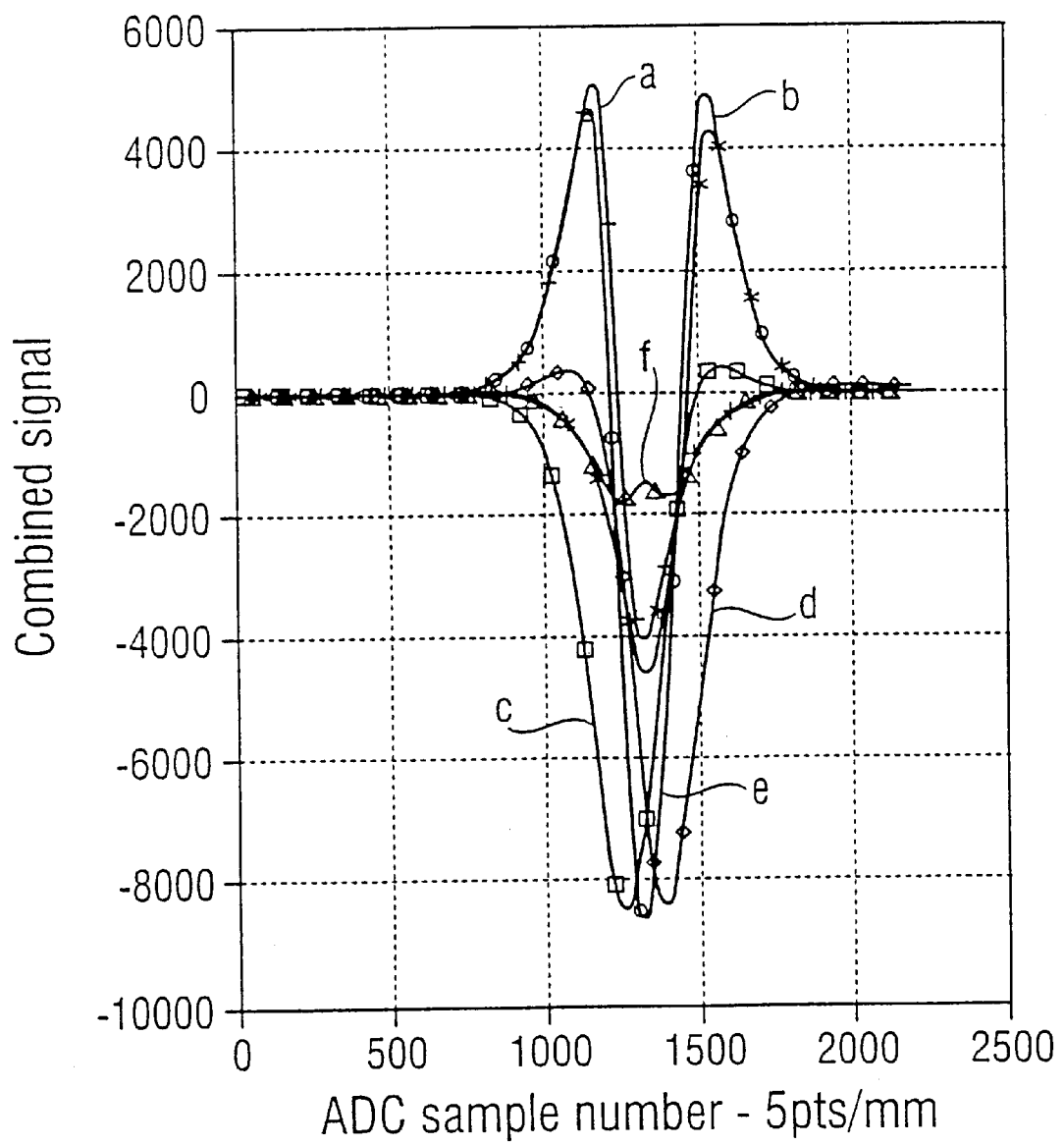
FIG. 10 shows an overlaid combined graphical presentation of the curves shown in FIGS. 8 and 9.

FIG. 10 shows the four signals from the sense coils 2A, 2B with the Add-curve e and the Threshold-curve f overlaid. As shown in this plot, if the Add-curve e falls more negative than the Threshold-curve f, a rebar R is below the sensor assembly.

Figure 11:
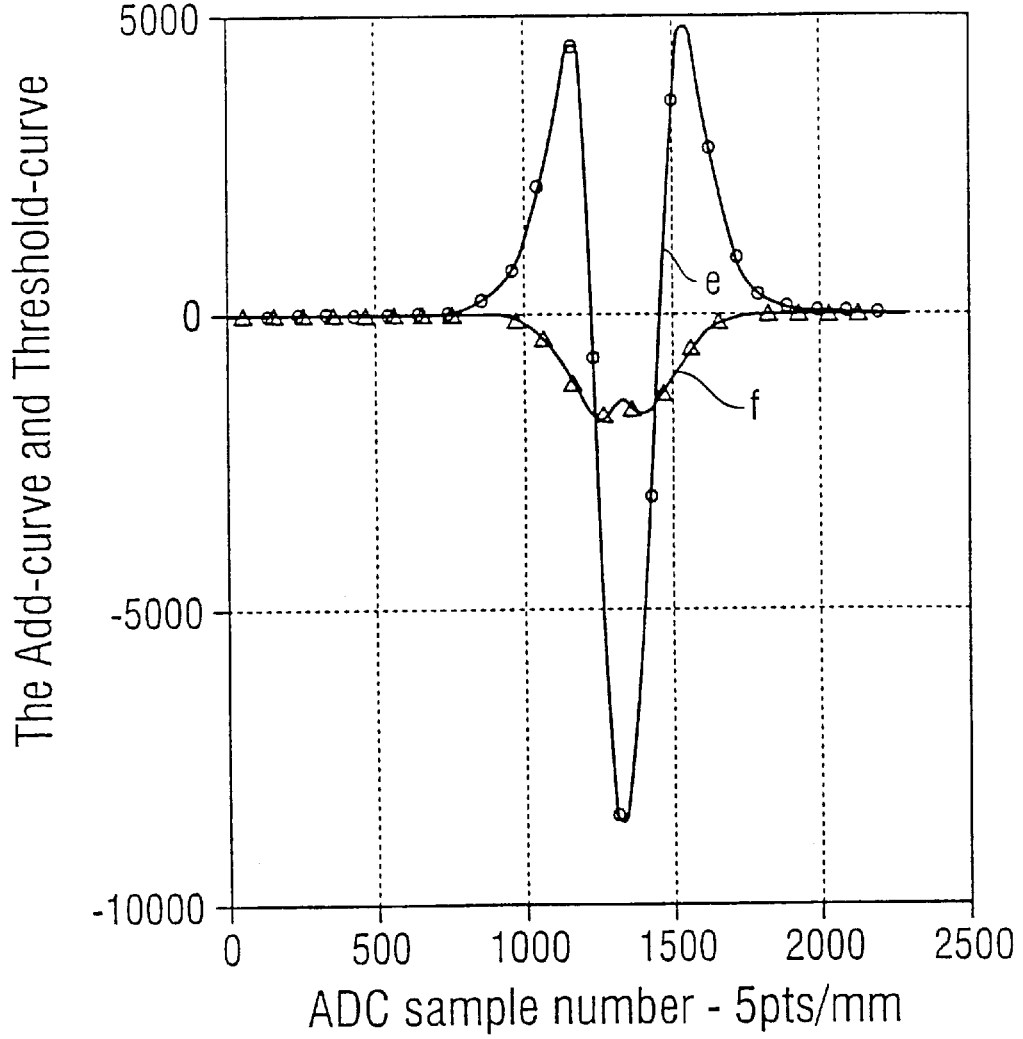
FIG. 11 is an extracted simplified presentation from FIG. 10 showing the Add-curve of FIG. 8 and the Threshold curve.

FIG. 11 is an extraction of FIG. 10 and shows the S-curve e and the Threshold-curve f, and in particular, the section is highlight d where a rebar R is detected.

In the case where no rebar R is present or the rebar is too far away from the sensor assembly, the four basic signals a to d are assumed to be lost in the system noise and there is no detectable shape.

Figure 12:
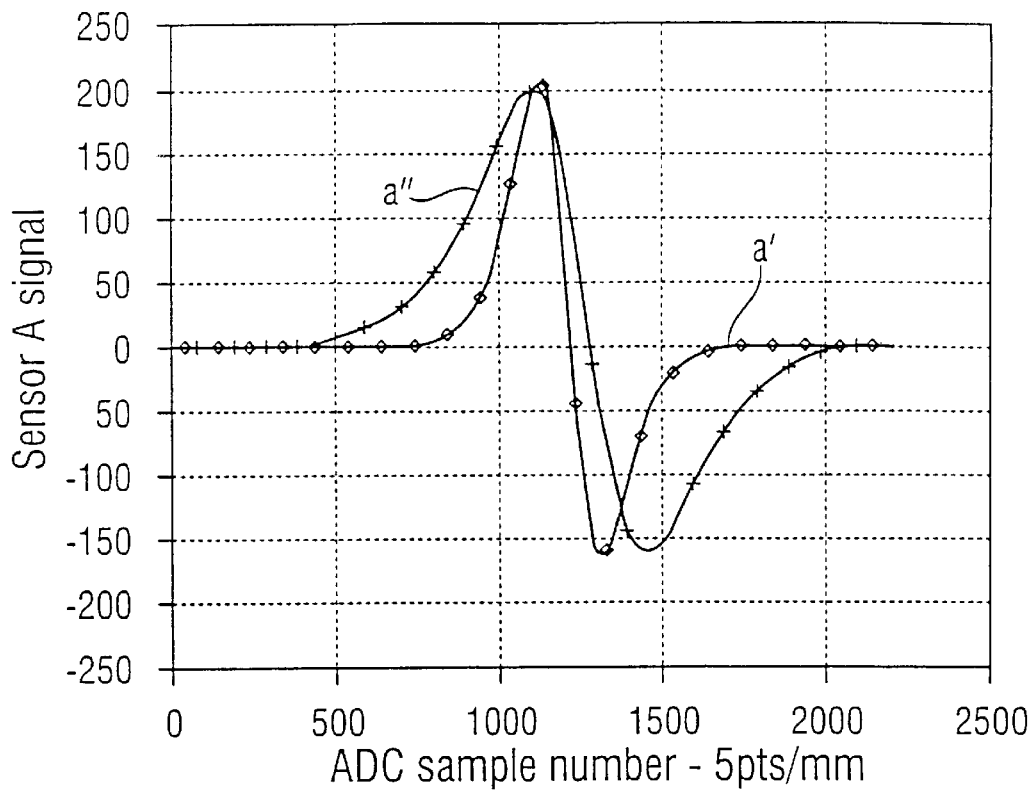
FIG. 12 corresponds to the graphical presentation of FIG. 3 and shows the dependence of the sense coil response signal from the depth of a hidden metal object.
Figure 13:
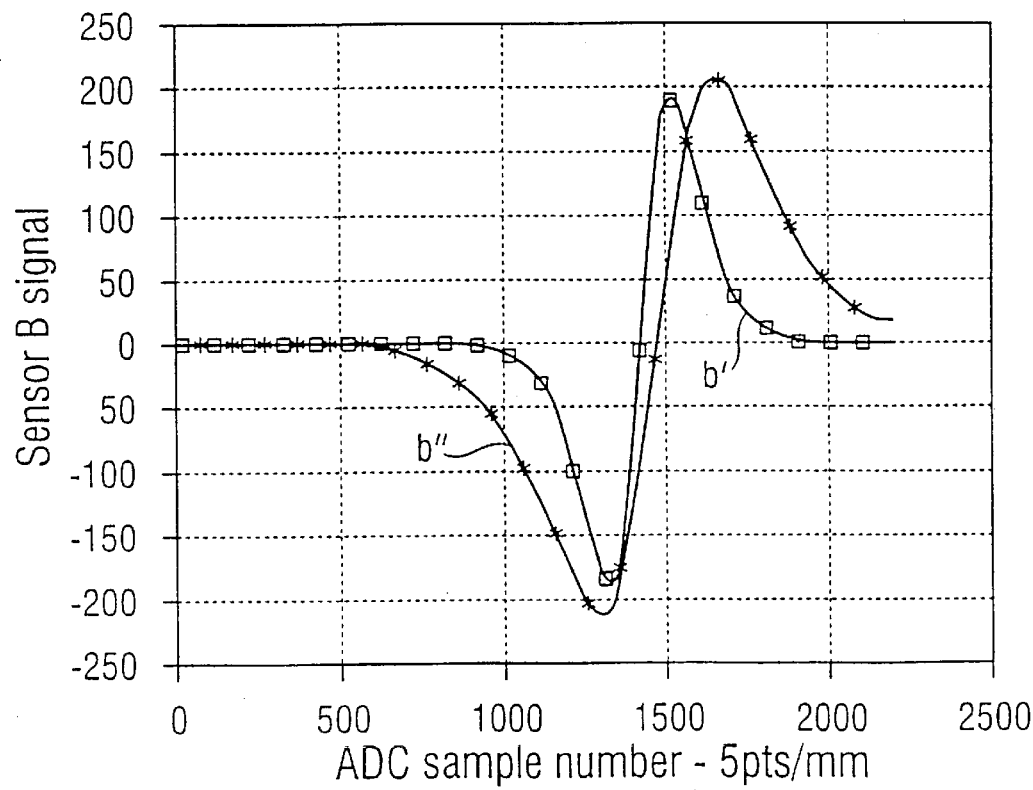
FIG. 13 corresponds to the graphical representation of FIG. 5, and again shows the depth-dependence of the response signal.

As the distance between the rebar R and the sensor assembly increases, the S curves get broader and lower in amplitude: This is caused by the focus of the magnetic field becoming weaker and wider with increasing distance. The plots of the S-curves shown in FIGS. 12 and 13 are the response for a 10 mm$^\square$ rebar R at a distance of 30 mm (curves a' and b') and 70 mm (curves a2' and b2'), respectively, from the sensor assembly. As can be seen, the wider S curves a" and b" are for the 70 mm deep rebar. The amplitudes of the signals have been normalized to allow an easier comparison of the curves.

Figure 8:
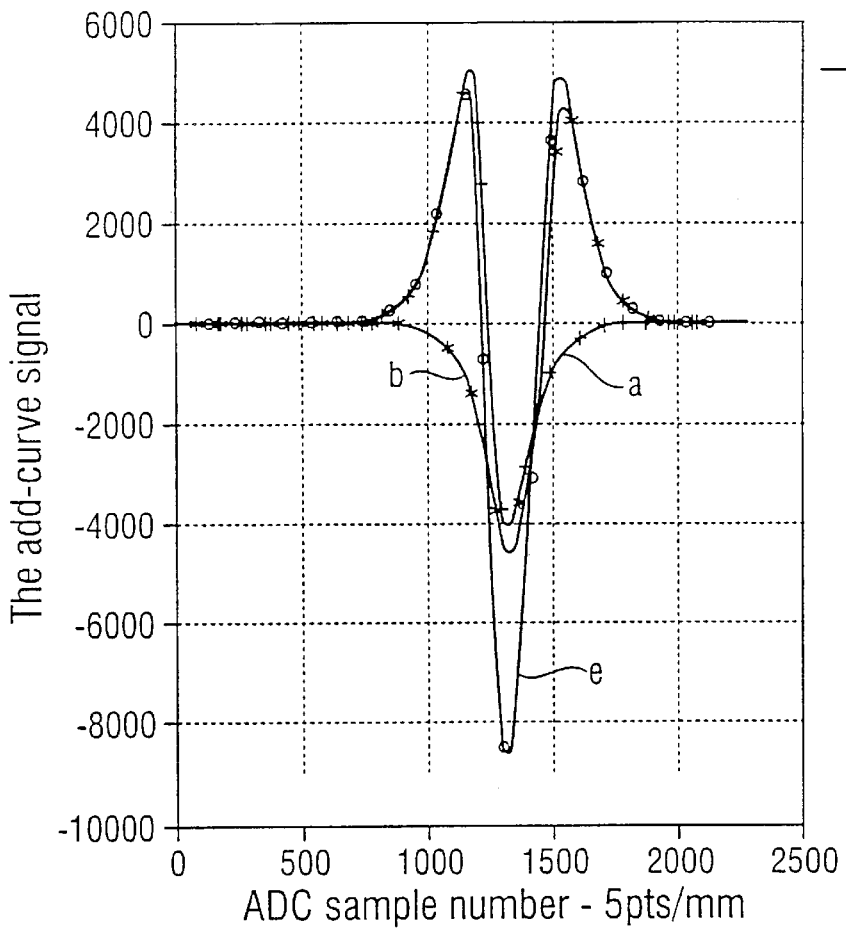
FIG. 8 shows a further graphical presentation, wherein the two voltage curves of FIG. 3 and FIG. 5 are overlaid to form an "Add-curve"
Figure 9:
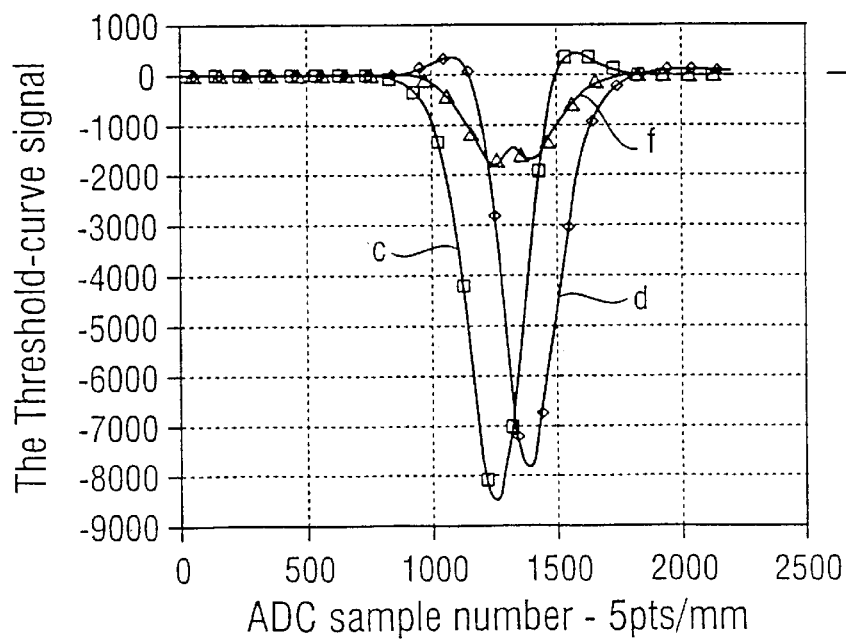
FIG. 9 shows an overlaid graphical presentation of the two "Hump-curves" of FIGS. 4 and 6 with an additional "Threshold-curve"
Figure 15:
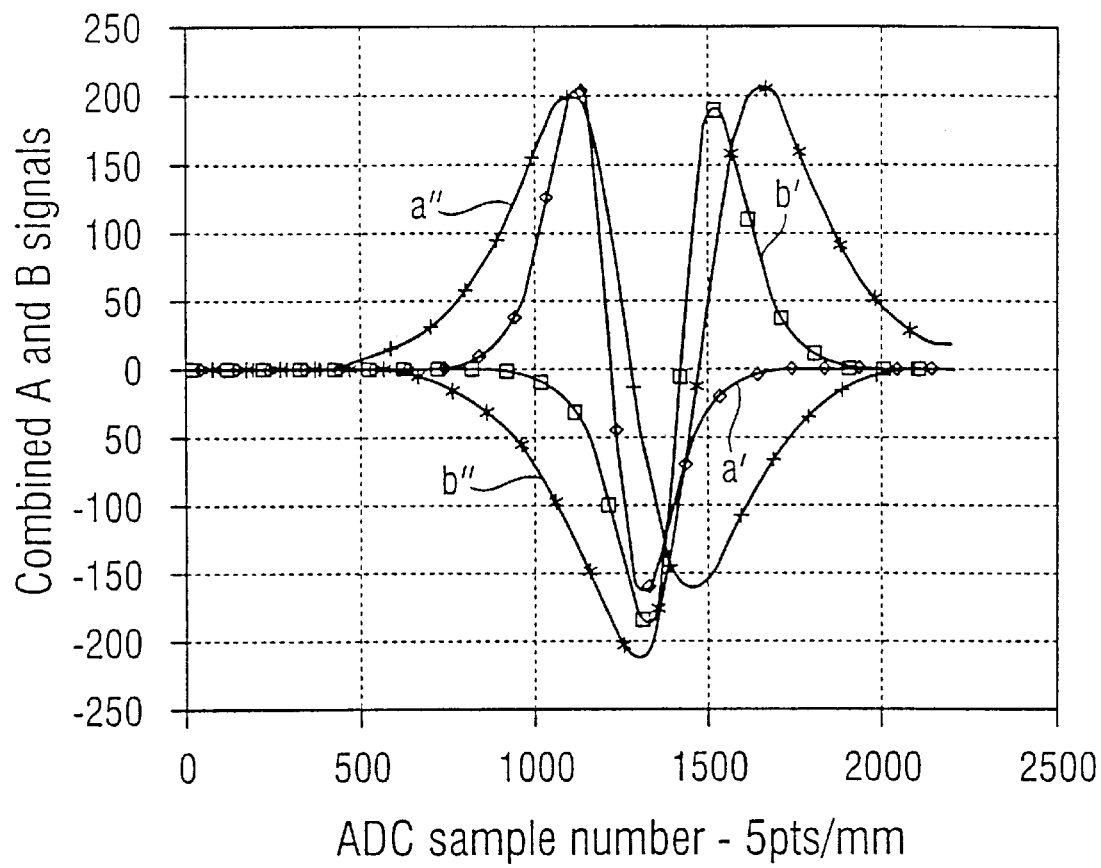
FIG. 15 shows an overlaid representation of the graphical representations of FIGS. 12 and 13.
Figure 16:
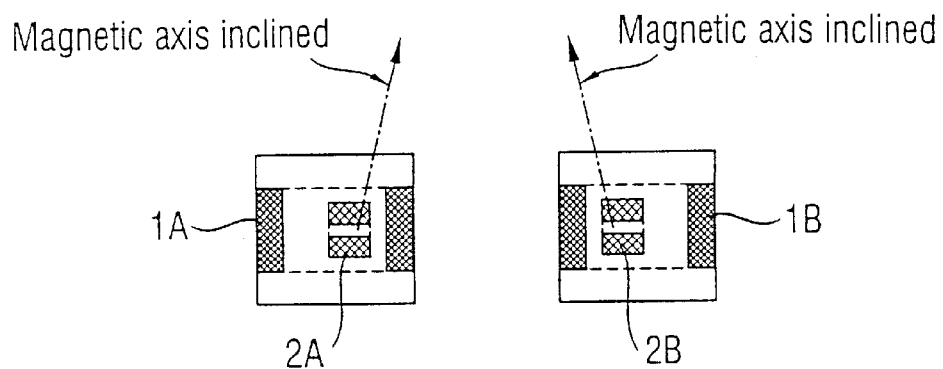
FIG. 16 corresponds to the embodiment of FIG. 1b, with shifted sense coils 2A, 2B to incline their magnetic axes.

In FIG. 15, the four curves of FIGS. 12 and 13 are overlaid for comparisons. These plots of FIG. 15 were taken with the coil assembly of FIG. 1 set with the magnetic axes of the field coils 1A, 1B and the sense coils 2A, 2B parallel, and it can be seen that the lower sections of the S curves or the 70 mm deep rebar (curves a", b") do not overlay. For minimizing this effect, it is possible to incline the magnetic axes of the sense coils 2A, 2B. FIG. 16 shows how the magnetic axes can be inclined to reduce this response spreading effect of the S curves having a wider response from deeper rebars. It follows from this that the mechanical geometry of the field coils 1A, 1B with respect to the sense coils 2A, 2B should be adjusted such that the negative (lower) parts of the S curves a, b overlay as shown in FIG. 8. The prototype assembly of the inductive sensor arrangement according to FIG. 1 complies with specific design restrictions of the mechanical envelope, e.g. if a hand-held tool like a drill hammer is to be inherently equipped with an inductive sensor according to the invention as shown by and further explained below with reference to FIG. 18. The assembly of FIG. 1 gives good electric performance over a reasonable broad range of rebar sizes and detection depth requirements.

Figure 14:
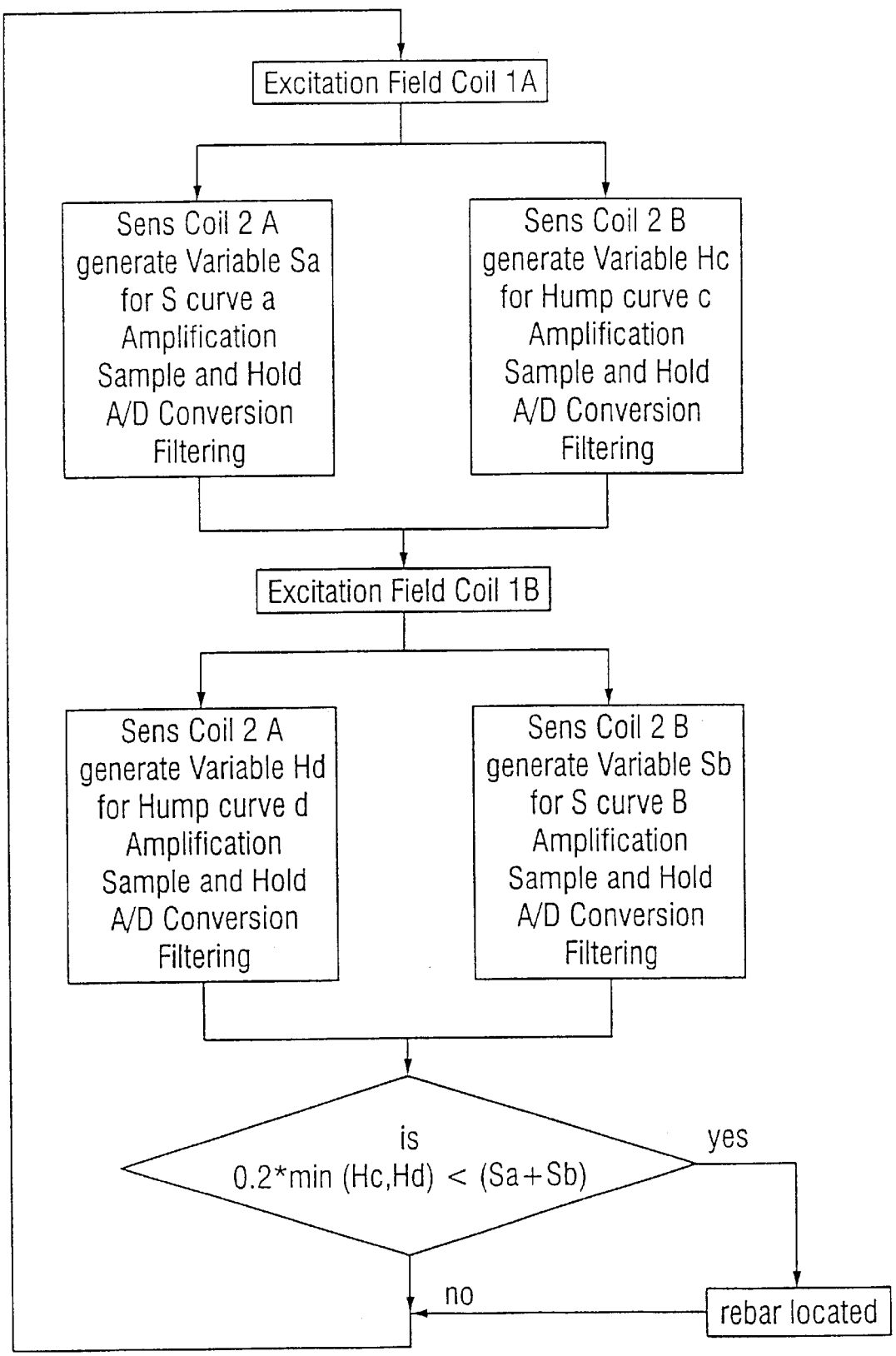
FIG. 14 shows an operation flow chart of a measurement method in accordance with the invention.

FIG. 14 is a flow chart of a measuring routine when the field coil 1A is excitated first with a subsequent excitation of the field coil 1B during a full measurement cycle resulting in four voltage values shown as "variable Sa", i.e. one value in curve a of FIG. 3, "variable Hc" referring to one value of the Hump-curve of FIG. 4 generated by sense coil 2B, and during excitation of field coil 1B generation of "variable Hd", i.e. one value of Hump-curve d (FIG. 6) as well as one variable "Sb" of S curve b supplied by sense, coils 2B. As may be realized by the expert, in order to perform the three processing steps explained above, amplification, temporary sample and hold, A/D-conversion and filtering of each voltage value developed by sense coils 2A, 2B is required before the comparison step for the Add-curve values against the Threshold-curve value in the lower part of the flow chart of the FIG. 14 can be performed to decide whether or not a rebar R is within the proximity of the sensor A, B.

Figure 17:
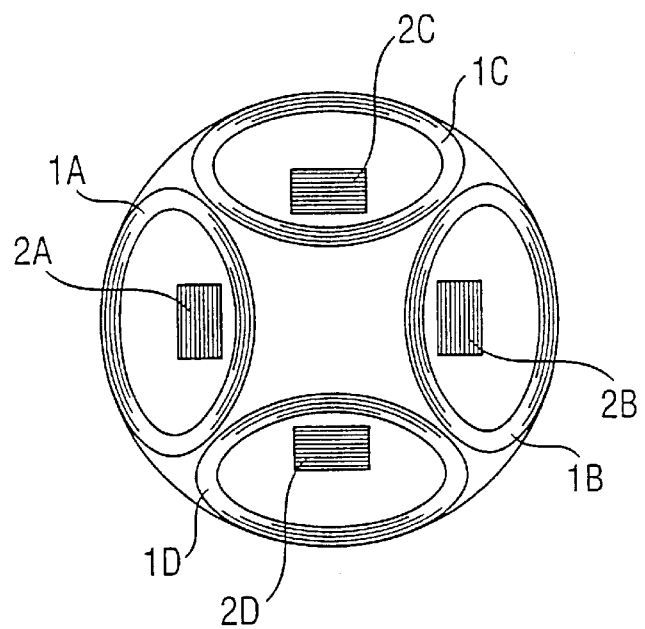
FIG. 17 shows a plan view and sectional view (FIG. 17a) of an inductive sensor head according to the invention comprising two orthogonally arranged field coil pairs and sense coils pairs, respectively.
Figure 17A:
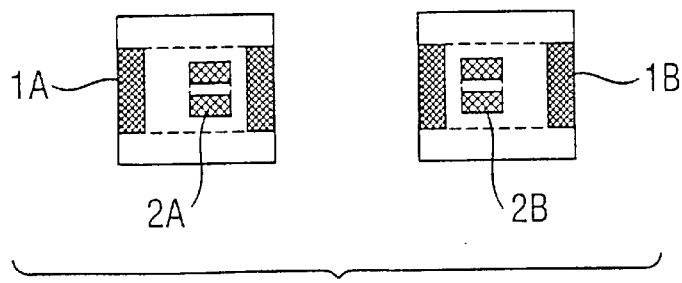

For providing a fully orthogonal system working for rebar angles of greater than ±60° it will be required to add another pair of coil assemblies 1C, 2C and 1D, 2D, respectively at 90° to the first set 1A, 2A and 1B, 2B, respectively. Such an arrangement is shown in FIG. 17 which will allow the inductive sensor to operate over a full 360° rotation of the rebar. With regard to the above described detection algorithm, each opposite pair of sensor coils 2A, 2B and 2D, 2C, respectively, will process the returned signals. If either of them detects a rebar then an indication will be given.

Figure 18:
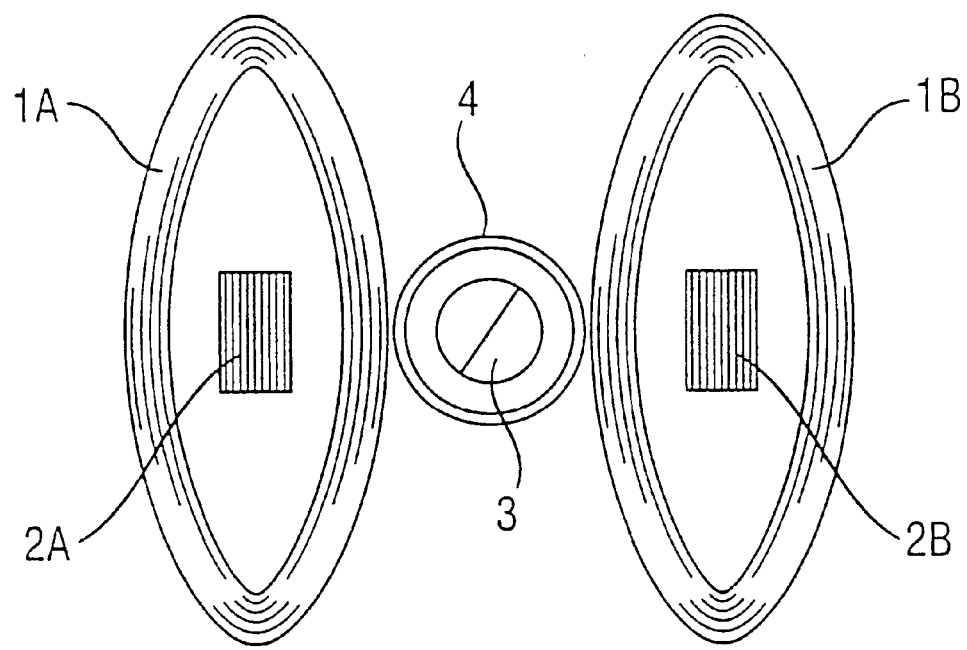
FIG. 18 shows the basic inductive sensor arrangement of FIG. 1 as applied to a hand-held tool machine, e.g., a drill hammer.

FIG. 18 visualizes in a bottom-side schematic plan view the integration of the inductive sensor according to FIG. 1 into a hand-held tool like a drill hammer. The inductive sensor coil assembly of FIG. 1 is integrated into the head portion of a drill hammer such that the pairwise field coils 1A, 1B with associated sensor coils 2A, 2B, respectively, encompass a drill tool 3 equidistantly at two sides thereof such that the drill tool 3 is positioned in the central axis between the two coil sets. Tests with such a drill hammer inherently equipped with an inductive sensor head according to the invention revealed that the movement of the tool and temperature changes of the tool disturb the magnetic field. This makes the determination of the ferrous object, i.e. the rebar, more difficult. According to a further improved embodiment of the invention the influence of the tool is compensated or shielded by a metallic shielding 4 which in the case of FIG. 18 is a tube-like cartridge surrounding the tool 3.

In some cases the cartridge 4 may disturb the symmetry of the coil arrangement. This disturbance may be balanced or removed by use of very small metallic bodies (not shown) fixed to the inner side surfaces of the two field coils (1A, 1B) facing each other.

In addition, a small light source like a LED or a miniaturized lamp may be integrated in the tool head of the hand-held tool machine if the view of the user to the work piece or the surface of an underground is shaded so that any surface markings can be clearly recognized and operating position of the tool machine will be possible.

What is claimed is:

1. An inductive sensor arrangement for detecting a ferrous object buried in a stationary surrounding medium comprising a field coil pair for generating a medium penetrating alternating magnetic flux field and a sense coil pair for sensing magnetic flux field disturbances caused by said ferrous object, said sensor arrangement being devised to be swept over the surface of a medium, said two field coils of said field coil pair being adjacently positioned at a predefined distance from each other and having non-overlapping winding planes arranged in the same geometric plane, and said pair of sense coils being respectively mounted essentially completely inside each of said field coils and being in an orientation to an axis of each of said field coils such that essentially no voltage is induced in said sense coils in an environment free of one of a ferrous object and a material.

2. The inductive sensor arrangement of claim 1, wherein the axes of said sense coils are arranged orthogonally to said axis of each of said field coils.

3. The inductive sensor arrangement of claim 2, wherein said sense coils are arranged within said field coils such that their magnetic axes are inclined by the same angle but in opposite directions.

4. The inductive sensor arrangement of claim 1, wherein two pairs of field coils are provided with orthogonally arranged pairwise distant and parallel axes, and wherein said two pairs of sense coils are positioned equidistant to each other and inside of a respective corresponding one of said field coils.

5. A method for detecting a ferrous object hidden in a surrounding medium by use of the inductive sensor arrangement according to claim 1, comprising the steps of:

sequentially exciting the field coil pair with defined equal current ramps sequentially supplied to the two field coils of one field coil pair to produce a changing magnetic flux penetrating the medium with at least two magnetic field patterns originating from different physical positions;

collecting four distinct output voltages from the two sense coils of one sense coil pair, including the steps of collecting a first output voltage from the first sense coil and a second output voltage from the other sense coil of the sense coil pair while the first field coil corresponding to the first sense coil is excited by a first one of said defined current ramps, and collecting a third output voltage from the other sense coil and a fourth output voltage from the first sense coil of the sense coil pair while the other field coil corresponding to the other sense coil is excited by a subsequent one of the defined current ramps; and gaining at least one of a present and non-present criterion for a ferrous object by algorithmic processing of the four voltages.

6. The method of claim 5, wherein said algorithmic processing of the four voltages comprises the steps of:

adding the first and the third output voltages to define an Addcurve;

comparing the second and fourth output voltages against each other and multiplying the more negative value of at least one of the second and the fourth output voltage by a certain reduction value to define a Threshold-curve;

comparing said Add-curve against said Threshold-curve; and determining for a "metallic object present" whether said Add-curve is more negative than said Threshold-curve.

7. The method of claim 6, wherein said algorithmic processing steps are performed sequentially with respect to a set of one voltage value each of said four output voltages supplied by said sense coil pair during one exitation current ramp cycle supplied to said field coil pair.

8. The method of claim 6 or 7, wherein said reduction value for defining said Threshold-curve is in the range of $-0.5 \leq \alpha \leq 0.9$.

9. The method of claim 6 or 7, wherein said reduction value for defining said Threshold-curve is in the range of $-0.2 \leq \alpha \leq 0.5$.

10. Application of the inductive sensor arrangement and the detecting method according to claim 5 as an integrated improvement of a hand-held tool machine for detecting of a hidden ferrous object in a workpiece or underground to be treated.

11. Inductive sensor head application according to claim 10, wherein said hand-held tool machine is a drill hammer.

12. Inductive sensor head application according to claim 11 in combination with a metallic shielded cartridge around the drill tool.

13. Inductive sensor head application according to claim 11 in combination with an integrated light source for illumination of the working area.

* * * * *